Patented June 2, 1925.

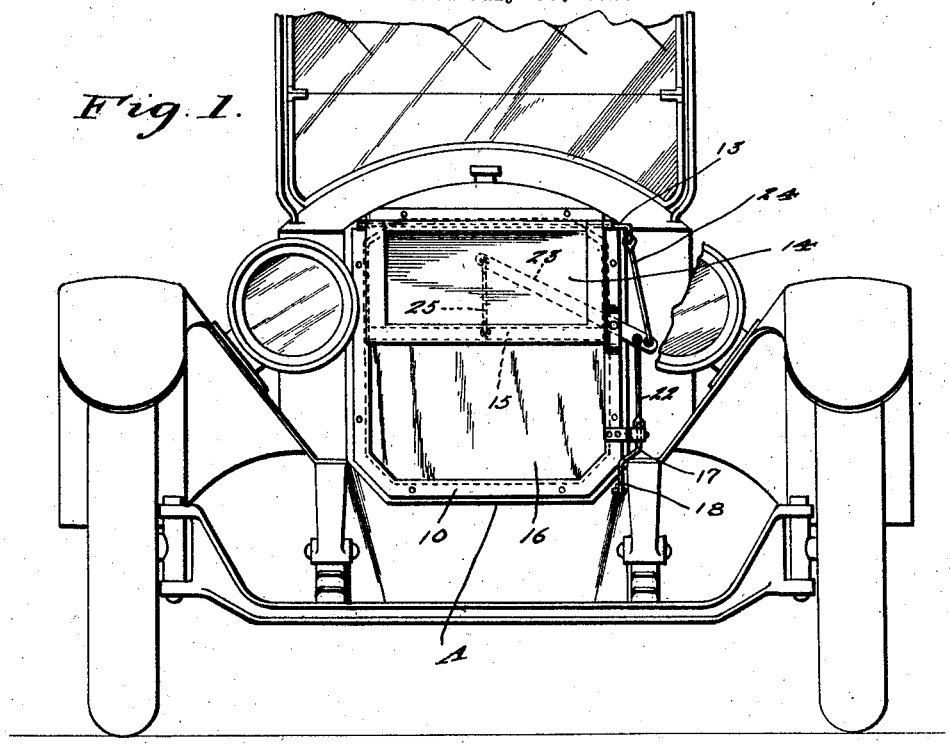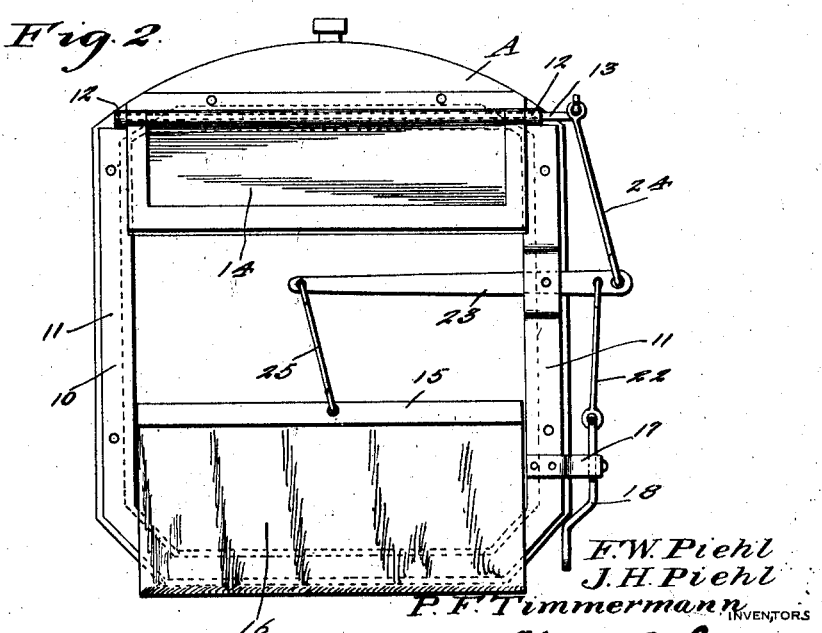

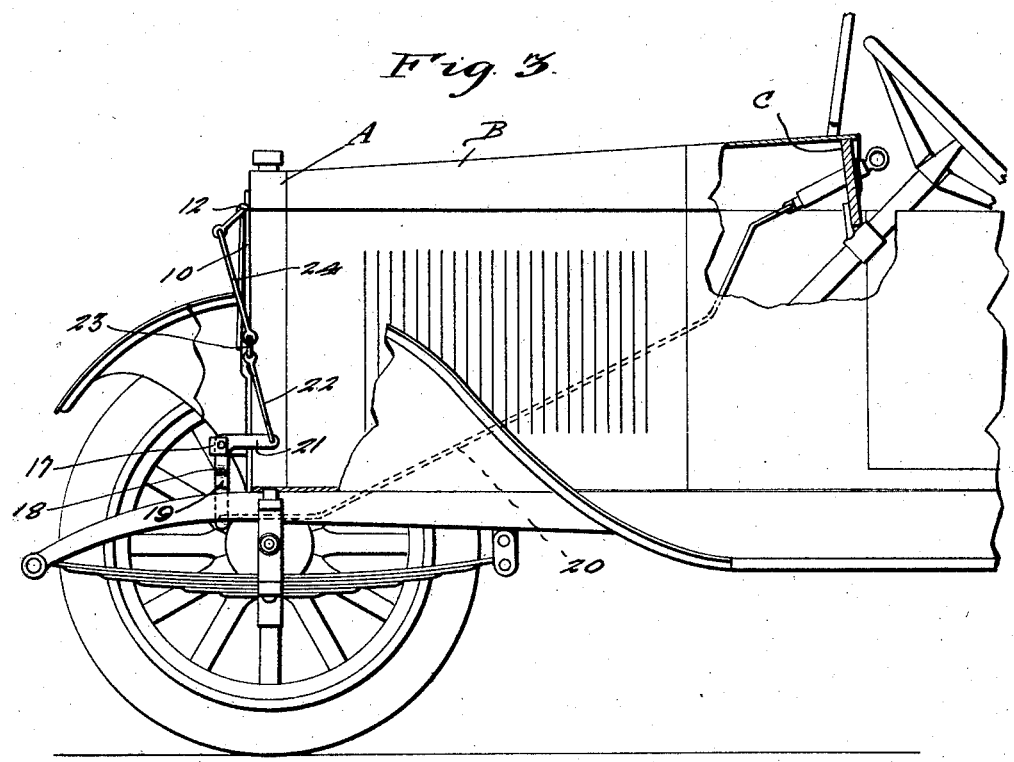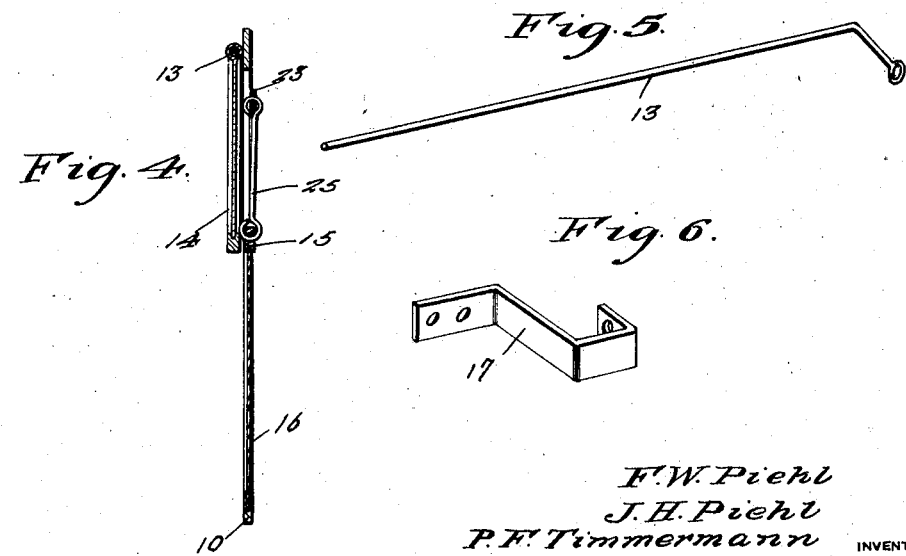

UNITED STATES PATENT OFFICE.

FRED W. PIEHL, JOHN H. PIEHL, AND PAUL F. TIMMERMANN, OF FAIRBANK, IOWA.

RADIATOR COVER.

Application filed July 15, 1922. Serial No. 575,427.

*To all whom it may concern:*

Be it known that we, FRED W. PIEHL, JOHN H. PIEHL, and PAUL F. TIMMERMANN, citizens of the United States, residing at Fairbank, in the county of Buchanan and State of Iowa, have invented new and useful Improvements in Radiator Covers, of which the following is a specification.

This invention relates to attachments for motor vehicles, and has for its object the provision of a novel device for covering the front of the radiator of an automobile in cold weather to prevent freezing when the car is standing still, the device including novel means for opening the cover to prevent boiling of the water when the car is in motion.

An important object is the provision of a device of this character in which the cover is movably mounted and provided with a link and lever control which is operated from the dash of the machine so that it is unnecessary for the driver or other occupant to get out and adjust the cover, the adjustment being taken care of easily while the car is in motion.

An additional object is the provision of a device of this character which will be simple and inexpensive in manufacture, easy to install and control, efficient and durable in service and a general improvement in the art.

With the above and other objects and advantages in view the invention consists in the details of construction to be hereinafter more fully described and claimed and illustrated in the accompanying drawings, in which:

Figure 1 is a front elevation of the device applied to an automobile and showing it in closed position, Figure 2 is a similar view showing it in open position, Figure 3 is a side elevation of the vehicle showing the operating means the dash being in section and showing the control element passing therethrough, Figure 4 is a detail vertical section through the device, Figure 5 is a perspective view of one operating rod, Figure 6 is a perspective view of the guide bracket.

Referring more particularly to the drawings the letter A designates the radiator of an automobile, B designates the hood and C the dash. In carrying out our invention we provide a frame 10 which is constructed of metal and which may be made of one piece or of several pieces suitably secured together, this frame being of a size and shape to be disposed conveniently against the front of a radiator. The frame includes side members 11 which have their upper ends looped as shown at 12 to define bearings within which is journaled a rod 13 carrying a movable plate 14. The numeral 15 designates a cross strip upon which is mounted a lower plate 16. When the upper plate is in downwardly extending vertical position and the lower plate is in raised position as shown in Figure 1 they cover the front of the radiator and prevent cold air from passing therethrough.

The control means consists of a bracket 17 secured at one lower corner of the frame 10 and having pivoted thereon an angle lever 18 having one arm 19 connected with a rod or wire 20 which extends up through the dash C in convenient position to be grasped and pulled by the operator. Connected with the other arm 21 of this angle lever is a rod or wire 22 which is connected with a lever 23 pivoted on the frame 10 and which is in turn connected with the plate 16 by a rod 25. Also connected with the lever 23 is a rod 24 which is connected with a crank on the rod 13.

In the operation, assuming that the cover is closed, in order to effect opening thereof, it is merely necessary that the operator grasp the wire 20 and pull upon it which will result in swinging the angle lever 18 and this will exert a push upon both of the rods 24 and 25 so as to cause upward swinging of the plate 14 and downward sliding of the plate 16 to a desired extent. Any catch means may be provided on the dash for holding the wire 20 at any position so that the cover plates will remain where put. In effecting closing the catch means is released whereupon the weight of the plate 14 will cause them to return to normal depending or vertical position gravitationally. The plate 14 is heavier than the plate 16 in order to raise the latter.

From the foregoing description and a study of the drawings it will be apparent that we have thus provided a simply constructed and consequently inexpensive protective device for radiators which will effectually prevent freezing of the water in cold weather and which may be partially opened or closed at will so as to control the temperature as it is well known that an engine runs with its maximum efficiency when the water is slightly below the boiling point. It is apparent that the construction is such that the device may be installed without necessitating any changes in the construction of the radiator itself. Owing to the simplicity it is obvious that there is nothing much to get out of order and that the device should have a long life and satisfactorily perform all the functions for which it is intended.

While we have shown and described the preferred embodiment of the invention it is of course to be understood that we reserve the right to make such changes in the form, construction and arrangement of parts as will not depart from the spirit of the invention or the scope of the subjoined claims.

We claim:

1. A radiator protector comprising a frame mounted on a radiator at the front thereof, a rod journaled transversely of the upper portion of said frame and carrying a plate adapted to cover substantially the upper half of the radiator, a crank arm on said rod, a second plate slidably mounted within the frame below said first named plate, a lever pivoted on the frame and having one end connected with said slidable plate and its other end connected with said crank arm, a bracket on said frame, an angle lever pivoted on said bracket and connected with the second named end of said lever, and means operable from the dash for swinging said angle lever to move said first named lever for swinging the first named plate and sliding the second named plate.

2. A device of the character described comprising a frame disposable against a radiator, an upper plate pivoted within the frame and covering a portion of the space, a second plate slidably mounted below said first named plate for covering the remainder of the space, a pivoted lever carried by the frame, rod members carried by said lever and connected with the respective plates, and means for moving said lever from the dash.

In testimony whereof we affix our signatures.

FRED W. PIEHL.
JOHN H. PIEHL.
PAUL F. TIMMERMANN.